United States Patent [19]
Harris

[11] Patent Number: 5,820,915
[45] Date of Patent: Oct. 13, 1998

[54] METHOD FOR THE PREPARATION OF A FIRST-PASS EFFECTIVE CITRUS-DERIVED SUBSTANCE AND PRODUCT THEREOF

[75] Inventor: James W. Harris, Silver Spring, Md.

[73] Assignee: Bioavailability Systems, L.L.C., Silver Spring, Md.

[21] Appl. No.: 673,800

[22] Filed: Jun. 27, 1996

[51] Int. Cl.⁶ .............................. A23L 1/212; A23L 1/222
[52] U.S. Cl. ........................... 426/616; 426/429; 426/651
[58] Field of Search ................................... 426/429, 616, 426/330.5, 333, 651

[56] References Cited

U.S. PATENT DOCUMENTS

| | | | |
|---|---|---|---|
| 1,840,798 | 1/1932 | Tressler | 426/429 |
| 3,071,474 | 1/1963 | Gross | 426/429 |
| 3,300,320 | 1/1967 | Distelkamp et al. | |
| 3,917,865 | 11/1975 | Shaw et al. | 426/429 |
| 4,497,838 | 2/1985 | Bonnell | 426/429 |
| 4,562,087 | 12/1985 | Kryger | |
| 5,229,116 | 7/1993 | Edgar et al. | |
| 5,356,929 | 10/1994 | Heindel et al. | |
| 5,362,714 | 11/1994 | Radford et al. | |
| 5,478,723 | 12/1995 | Parkinson et al. | |
| 5,494,681 | 2/1996 | Cuca et al. | |
| 5,567,592 | 10/1996 | Benet et al. | |

FOREIGN PATENT DOCUMENTS

WO 95/20980 8/1995 WIPO.

OTHER PUBLICATIONS

Ashurst, P.R. 1995, Food Flavorings, Blackie Academic & Professional, N.Y., p. 166.

David Edwards et al., "Accelerated Communication Identified of 6',7'-Dihydroxybergamottin, A Cytochrome P450 Inhibitor, In Grapefruit Juice", Drug Metabolism and Disposition, The American Society For Pharmacology and Experimental Therapeutics, vol. 27, No. 12, pp. 1287–1290 (1996).

Georgopapadakou et al, "Antifungal Agents: Chemotherapeutic Targets and Immunologic Strategies" Antimicrobial Agents and Chemotherapy, 40: 279–291, 1996.

Garteiz et al, "Pharmacokinetics Biotransformation Studies of Terfenadine in Man" Arzneim.–Forsch., 32: 1185–1190, 1982.

Klippert et al, "Prediction of Intestinal First–Pass Effort of Phenacetin in the Rat From Enzyme Kinetic Data—Correlation with In Vivo Data Using Mucosal Blood Flow", Biochemical Pharmacology, 31: 2545–2548, 1982.

Tinel et al, "Inactivation of Human Liver Cytochrome P–450 By the Drug Methoxsalen and Other Posoralen Derivatives", Biochemical Pharmacology, 36:951–955, 1987.

Mays et al, "Activation of 8–Methoxypsoralen by Cytochrome P–450: Enzyme Kinetics of Covalent Binding and Influence of Inhibitors and Inducers of Drug Metabolism", Biochemical Pharmacology, 38: 1647–1655, 1989.

Maenpaa et al, "Differential Inhibition of Coumarin 7–Hydroxylase Activity in Mouse and Human Liver Microsomes", Biochemical Pharmacology, 45: 1035–1042, 1993.

Fuhr et al, "Inhibitory Effect of Grapefruit Juice and its Bitter Principal, Naringenin, on CYP1A2 Dependent metabolism of Caffeine in Man", Br. J. Clin. Pharmac., 35: 431–436, 1993.

Ducharme et al, "Trough Concentrations of Cyclosporine in Blood Floowing Administration with Grapefruit Juice," Br. J. Clin. Pharmac., 36: 457–459, 1993.

(List continued on next page.)

*Primary Examiner*—Helen Pratt
*Attorney, Agent, or Firm*—Oblon, Spivak, McClelland, Maier & Neustadt, P.C.

[57] ABSTRACT

A method for the preparation of a first-pass effective citrus derived substance. First, the concentration of volatile components is reduced. Then, the material is extracted with a 60/40 to 40/60 vol/vol mixture of alcohol and water.

14 Claims, 4 Drawing Sheets

OTHER PUBLICATIONS

Rashid et al, "Quercetin, an In Vitro Inhibitor of CYP3A, Does Not Contribute to the Interaction Between Nifedipine and Grapefruit Juice," Br. J. Clin. Pharmac., 36: 460–463, 1993.

Proppe et al, "Influence of Chronic Ingestion of Grapefruit Juice on Steady–State Blood Concentrations of Cyclosporine A in Renal Transplant Patients with Stable Graft Function," Br. J. Clin. Pharmac., 39: 337–338, 1995.

Rashid et al, "Factors Affecting the Absolute Bioavailability of Nifedpine", Br. J. Clin. Pharmac., 40: 51–58, 1995.

Bailey et al, "Grapefruit Juice–Felodipine Interaction: Reproducibility and Characterization with the Extended Release Drug Formulation", Br. J. Clin. Pharmac., 40: 135–140, 1995.

Breckenridge, "Clinical Significance of Interactions with Antifungal Agents", Br. J. Dermatology, 126: 19–22, 1992.

Guengerich et al, "In Vitro Inhibition of Dihydropyridine Oxidation and Aflatoxin $B_1$ Activation in Human Liver Microsomes by Naringenin and Other Flavonoids", Carcinogenesis, 11: 2275–2279, 1990.

Gray, "Structural Diversity and Distribution of Coumarins and Chromones in the Rutales", Chemistry and Chemical Taxonomy of the Rutales, Waterman & Grundon, eds., 97–146, 1983.

Bailey et al, "Grapefruit Juice and Drugs: How Significant is the Interaction?", Clin. Pharmacokinet. 26(2): 91–98, 1994.

Mahon et al, "Metabolism of Flurazepam by the Small Intestine," Clin. Pharmacol. Ther., 22: 228–233, 1977.

Mays et al, "Methoxsalen is a Potent Inhibitor of the Metabolism of Cafefine in Humans," Clin. Pharmacol. Ther., 42: 621–626, 1987.

Clin. Pharmacol. Ther., abstract PI–35, 138, Feb. 1996.

Mays et al, "Methoxsalen is a Potent Inhibitor of the Metabolism of Caffine in Humans", Clin. Pharmacol. Ther., 6: 621–626, 1987.

Soons et al, "Grapefruit Juice and Cimetidine Inhibit Sereoselective Metabolism of Nitrendpine in Humans," Pharmacol. Ther., 50: 394–403, 1991.

Olkkloa et al, "A Potentially Hazardous Interaction Between Erythromycin and Midazolam", Clin. Pharmacol. Ther., 53: 298–305, 1993.

Bailey et al, "Grapefruit Juice—Felodpine Interaction: Mechanism, Predictability, and Effect of Naringin", Clin. Pharmacol. Ther., 53: 637–642, 1993.

Bailey et al, "Effect of Grapefruit Juice and Naringin on Nisoldipine Pharmacokinetics", Clin. Pharmacol. Ther., 54: 589–594, 1993.

Varhe et al, "Oral Triazolam is Potentially Hazardous to Patients Receiving Systemic Antimycotics Ketoconazole or Itraconazole", Clin. Pharmacol. Ther., 56: 601–607, 1994.

Hollander et al, "The Effect of Grapefruit Juice on Cyclosporine and Prednisone Metabolism in Transplant Patients", Clin. Pharmacol. Ther., 57: 318–324, 1995.

Kupferschmidt et al, "Interaction Between Grapefruit Juice and Midazolam in Humans", Clin. Pharmacol. Ther., 58: 20–28, 1995.

Hukkinen et al, "Plasma Concentrations of Triazolam are Increased by Concomitant Ingestion of Grapefruit Juice-"Clin. Pharmacol. Ther., 58: 127–131, 1995.

Fuhr et al, "The Fate of Naringin in Humans: A Key to Grapefruit Juice—Drug Interactions?", Clin. Pharmacol. Ther., 58: 365–373, 1995.

Ducharme et al, "Disposition of Intravenous and Oral Cyclosporine After Administration with Grapefruit Juice", Clin. Pharmacol. Ther., 57: 485–491, 1995.

Ameer et al, "Flavanone Absorption After Naringin, Hesperidin, and Citrus Administration", Clin. Pharmacol. Ther., 60: 34–40, 1996.

Lee et al, "Grapefruit Juice and its Flavonoids Inhibit 11β–Hydroxysteroid Dehydrogenase", Clin. Pharmacol. Ther., 59: 62–71, 1996.

Benton et al, "Grapefruit Juice Alters Terfenadine Pharmacokinetics, Resulting in Prolongation of Repolarization on the Electrocardiogram", Clin. Pharmacol. Ther., 59: 383–388, 1996.

Bailey et al, "Erythromycin–Felodipine Interaction: Magnitude, Mechanism, and Comparison with Grapefruit Juice", Clin. Pharmacol. Ther., 60: 25–33, 1996.

Weber et al, "Can Grapefruit Juice Influence Ethinylestradiol Bioavailability?", Contraception, 53: 41–47, 1996.

Merkel et al, "Grapefruit Juice Inhibits 7–Hydroxylation of Coumarin in Healthy Volunteers", Eur. J. Clin. Pharmacol., 46: 175–177, 1994.

Ha et al, "In Vitro Inhibition of Midazolam and Quinidine Metabolism by Flavonoids", Eur. J. Clin. Pharmacol., 48: 367–371, 1995.

Lundahl et al, "Relationship Between Time of Intake of Grapefruit Juice and its Effects on Pharmacokinetics and Pharmacodynamics of Felodipine in Healthy Subjects", Eur. J. Clin. Pharmacol., 49: 61–67, 1995.

Schubert et al, "Flavonoids in Grapefruit Juice Inhibit the In Vitro Hepatic Metabolism of 17β–Estradiol", Eur. J. Drug Metabolism and Pharmacokin., 20: 219–224, 1995.

Food Chemicals Codex, National Academy Press, pp. 186, 584, 225–226, & 819, 1996.

Musajo et al, "Photosensitizing Properties of Furocoumarins", Herba Hungaria, 10: 79–95, 1971.

Honig et al, "Terfenadine–Ketoconazole Interaction—Pharmacokinetic and Electrocardiographic Consequences", JAMA, 269: 1513–1518, 1993.

Schedl et al, "Absorption of Steroid Hormones from the Human Small Intestine", J. Clin. Endocrinol. and Metab., 25: 1309–1316, 1965.

Honig et al, "Grapefruit Juice Alters the Systemic Bioavailability and Cardiac Repolarization of Terfenadine in Poor Metabolizers of Terfenadine", J. Clin. Pharmacol., 36: 345–351, 1996.

Owusu–Yaw et al, "Alcohol Deterpenation of Orange Oil", J. Food Science, 51: 1180–1182, 1986.

Butman et al, "Prospective Study of the Safety and Financial Benefit of Ketoconazole as Adjunctive Therapy to Cyclosporine After Heart Transplantation", J. Heart Lung Transplant, 10: 351–358, 1991.

Pathak et al, "Relationship of Molecular Configuration to the Activity of Furocoumarins which Increase the Cutaneous Responses Following Long Wave Ultraviolet Radiation", J Investigative Dermatology, 32: 255–262, 1959.

Bickers et al, "The Effect of Psoralens on Hepatic and Cutaneous Drug Metabolizing Enzymes and Cytochrome P–450", J Investigative Dermatology, 79: 201–205, 1982.

Fouin–Fortunet et al, "Inactivation of Cytochrome P–450 by the Drug Methoxalen", J Pharmacol and Exp. Ther., 236: 237–247, 1985.

Letteron et al, "Inactivation and Induction of Cytochrome P–450 by Various Psoralen Derivatives in Rats", J. Pharmacol. and Exp. Ther., 238: 685–692, 1986.

Musajo et al, "L'attivta Fotodinamica delle Cumarine Naturali", La Chimica e L Industria, XXXV, 13–15, 1953.

First et al, "Concomitant Administration of Cyclosporin and Ketoconazole in Renal Transplant Recipients", The Lancet, Nov. 18, 1198–1200, 1989.

Bailey et al, "Interaction of Citrus Juices with Felodipine and Nifedipine", The Lancet, Feb. 2, 337: 268–269, 1991.

The Lancet, Apr. 6, 337: 854, 1991.

Yee et al, "Effect of Grapefruit Juice on Blood Cyclosporin Concentration", The Lancet, Apr. 15, 345: 955–956, 1995.

Johnston et al, "Effect of Grapefruit Juice on Blood Cyclosporin Concentration", The Lancet, Jul. 8, 346: 122–124, 1995.

Edwards et al, "Naringin and Naringenin are not the Primary CYP3A Inhibitors in Grapefruit Juice", Life Science, 59: 1025–1030, 1996.

Nature, Feb. 6, 185: 382–383, 1960.

Nephrology Dialysis Transplantation, 8: 375, 1993.

Keogh et al, "Ketoconazole to Reduce the Need for Cyclosporine After Cardiac Transplantation", The New England J Medicine, 333: 628–633, 1995.

Altman, "Research, Often Unpredictable, Leads Doctor to Unexpected Fruit", The New York Times, section C p. 3, Feb. 19, 1991.

Schubert et al, "Inhibition of 17β–Estradiol Metabolism by Grapefruit Juice in Ovarieciomized Women", Maturitas, 20: 155–163, 1995.

The Medical Letter, 37: 73–74, Aug. 18, 1995.

The Merck Index, Merck Research Laboratories, 1996.

Caldwell et al, "Metabolism of Drugs by the Gastrointestinal Tract", Presytemic Drug Elimination, George, Shand, & Renwick, eds., 29–41, 1982.

Ilett et al, "In Vivo Studies of Gut Wall Metabolism", Presytemic Drug Elimination, George, Shand, & Renwick, eds., 42–65, 1982.

George, "Methods for Distinguishing Between the Various Sites of First–Pass Metabolism in Man", Presytemic Drug Elimination, George, Shand, & Renwick, eds., 189–205, 1982.

The People's Pharmacy, Graedon & Graedon, pp. 166–166, 398–399, 1996.

The People's Pharmacy, Graedon's Guide to Grapefruit Interactions, 1996.

Neal et al, "Inhibition of Insect Cytochromes P450 by Furanocoumarins", Pesticide Biochemnistry and Physiology, 50: 43–50, 1994.

Sigusch et al, "Influence of Grapefruit Juice on the Pharmacokinetics of a Slow Release Nifedipine Formulation", Pharmazie, 49: 522–524, 1994.

Ashwood–Smith et al, "Isopimpinellin is Photobiologically Inactive", Photochemistry and Photobiology, 56: 563–565, 1992.

Hartiala, "Metabolism of Hormones, Drugs and Other Substances by the Gut", Physiological Reviews, 53: 496–534, 1973.

Gray et al, "Coumarins in the Rutaceae"Phytochemistry, 17: 845–864, 1978.

Woo et al, "Isolation of Drug Metabolism Modifiers from Roots of Angelica Koreana", Planta Medica, 45: 234–236, 1982.

Wagstaff, "Dietary Exposure to Furocoumarins", Regulatory Toxicology and Pharmacology, 14: 261–272, 1991.

Ivie et al, "Natural Toxicants in Human Foods: Psoralens in Raw and Cooked Parsnip Root", Science, 213: 909–910, 1981.

First et al, "Cyclosporine Dose Reduction by Ketoconazole Administration in Renal Transplant Recipients", Transplantation, 51: 365–370, 1991.

First et al, Cyclosporine–Ketoconazole Interaction, Transplantation, 55: 1000–1004, 1993.

Patton et al, "A Preliminry Report of Diltiazem and Ketoconazole", Transplantation, 57: 889–892, 1994.

Min et al, "Effect of Grapefruit Juice on Cyclosporine Pharmacokinetics in Renal Transplant Patients", Transplantation, 62: 123–125, 1996.

First et al, "Safety and Efficacy of Long–Term Cyclosporine–Ketoconazole Administration and Preliminary Results of a Randomized Trial", Transplantation Proceedings, 25: 591–594, 1993.

The Washington Post, section A, p. 11, Aug. 30, 1996.

Obermeier et al, "Effects of Bioflavonoids on Hepatic P450 Activities", Xenobiotica, 25: 575–584, 1995.

METHOD FOR THE PREPARATION OF A FIRST-PASS EFFECTIVE CITRUS-DERIVED SUBSTANCE AND PRODUCT THEREOF

BACKGROUND OF THE INVENTION

1. Field of the Invention

The present invention relates to a citrus (most preferably lime and grapefruit) extract, oil, concentrate juice, by-product, etc. having reduced levels of phototoxic furocoumarins preferably provided as a dietary supplement or as a medical food or as some other type of food product or as a drug preparation, or in some other physical form, and that, in addition to any other function it has, if any, functions as an inhibitor of the first-pass effect of orally-administered drugs. The invention further relates to the particular chemical species responsible for the observed inhibition of the first-pass effect, methods for producing the invention extract, etc.

2. Discussion of the Background

The "first pass effect" of drugs given orally refers to the process of drug degradation during a drug's transition from initial ingestion to circulation in the blood stream. Often discussed in terms of "bioavailability", it is not uncommon for a drug that is administered orally to be given in a 5-fold or greater amount than ultimately necessary due to the degradation that occurs in the body after intake. For example, the impact of the first-pass effect can be demonstrated with the case of the antihistamine terfenadine, wherein 99.5% of a tablet given by mouth is quickly changed to metabolites; hence, the bioavailability of terfenadine is approximately 0.5% (D. Garteiz et al., Arzneim.-Forsch., 1982; 32:1185–1190). As a further example, cyclosporin A, administered to organ transplant patients, has a median oral bioavailability of approximately 30% and a bioavailability range of approximately 8–92% among patients. Because of this large interindividual variation in cyclosporine bioavailability, frequent monitoring of blood concentrations during therapy initiation is necessary.

The inhibition of a particular xenobiotic metabolism as a mechanism of action generally, as well as the inhibition of the first pass effect with chemical agents specifically, is well-known in the art and has been for some time. Examples include the treatment of methanol (wood alcohol) poisoning with ethanol and the inhibition of the first pass effect of cyclosporin with ketoconazole. See, for example, First, R. M. et al., The Lancet, 1198, Nov. 18, 1989, incorporated herein by reference.

Although the enzyme type(s) responsible for the first pass effect have not been fully identified, research has focused on agents capable of inhibiting the cytochrome P450 system. See, e.g., U.S. Pat. No. 5,478,723 incorporated herein by reference for a more full description of the P450 system. As reported by A. Keogh et al. (N. Eng. J. Med., Vol. 333, No.10, p. 628, 1995) and S. Butman et al. (J. Heart Lung Transpl., Vol. 10, No. 3, 1991), the dose of cyclosporin required by heart transplant patients could be reduced by approximately 85% when cyclosporin was co-administered with ketoconazole. In economic terms, both references estimated cost savings to be equal to approximately $5,000 per year per patient. Other drugs which are subject to the first-pass effect and whose bioavailability is increased by inhibitors commonly given to humans include midazolam (K. Olkkola et al, Clin. Pharmacol. Ther., 1993, 53:298–305), terfenadine (Seldane) (P. Honig et al., JAMA, Vol. 269, No. 12, 1513, 1993) and triazolam (Varhe, A. et al, Clin. Pharmocol. Ther., 1994, 56:601–7).

In addition to ketoconazole, fluconazole, itraconazole, miconazole, erythromycin and troleandomycin have been identified as inhibitors of the first-pass effect. All of these compounds, however, are antimicrobials and antifungal agents. Because of the heightened current awareness of the fact that overuse of such agents can result in resistant microbial strains, because the most effective inhibitors are antimicrobials, and because transplant and HIV-infected patients have compromised immune systems, the use of these inhibitors of the first-pass effect has significant drawbacks and, for example, in the case of ketoconazole, the purposeful co-administration of this inhibitor with drugs susceptible to the first-pass effect has not become widespread. In fact, the emergence of antifungal drug resistance in immunocompromised patients is already known (T. J. Walsh: "Emergence of Antifungal Drug Resistance in Immunocompromised Patients" Seminar, National Institutes of Health, Feb. 7, 1996).

In 1991, Bailey et al. reported (Bailey, D. G., et al, The Lancet, Vol. 337, Feb. 2, 1991, p. 268, incorporated herein by reference) that grapefruit juice increased the bioavailability of felodipine, and indicated that the inhibition of cytochrome P450 enzymes by bioflavonoids could explain their findings. This identification of bioflavonoids as the active ingredient in grapefruit juice was immediately challenged by R. Chayen et al. (The Lancet, Vol. 337, Apr. 6, 1991, p. 854) who suggested that susquiterpenoid compounds rather than flavonoids were the active ingredients in grapefruit juice responsible for inhibition of the first-pass effect. Although Bailey and Edgar were granted a patent (U.S. Pat. No. 5,229,116, incorporated herein by reference) directed to a method of increasing the bioavailability of a pharmaceutical agent by co-administration of a flavonoid such as naringin, their own recent work has openly brought into question the accuracy of their initial identification of flavonoids as active ingredient. See, for example, Bailey et al., Clin. Pharmacokinet. 26 (2): 91–98, 1994, particularly pages 95 and 96 thereof.

The reported effects of grapefruit juice as an effective inhibitor of the first-pass effect has lead to numerous research articles regarding the inhibition of the first-pass effect by grapefruit juice on, e.g., nifedipine, nitrendipine, nisoldipine, cyclosporin A, midazolam, triazolam, coumarin, and caffeine. As these results have become better known, the so-called "grapefruit juice effect" has become the subject of newspaper articles, newsletters and medical texts intended for the general public. See, for example, "The Medical Letter", Vol. 37 (issue 955) Aug. 18, 1995, *The Peoples Pharmacy*, Chapter 4 (St. Martin's Press) 1996, p. 41, and the Feb. 19, 1991 newspaper article regarding felodopine and grapefruit juice in the New York Times (section C, page 3, column 1).

A review of the published studies that demonstrate the grapefruit juice effect also shows that the magnitude of the effect appears to be related to the source of the juice. In fact, the production of commercial citrus juice involves a complicated series of factors that increase the variability of the final product's composition. These factors include the squeezing technique, the concentration technique, the origin of the fruit, the ripeness of the fruit at harvest, the admixture of fruits differing in origin and ripeness, the admixture of juice and fruit tailings, etc. Because the active agents in the grapefruit juice that inhibit the first-pass effect were heretofore unknown or misidentified, scientists and consumers could not choose a grapefruit juice preparation and rely upon its utility to inhibit the first-pass effect.

Moreover, grapefruit juice in particular and citrus products in general are known to contain phototoxic furocoumarin derivatives including psoralen, xanthotoxin and bergapten. While these compounds are useful for the controlled, clinical treatment of selected dermatological diseases including vitiligo, psoriasis and mycosis fungoides, they are also known to be toxic, in particular, phototoxic. The structure-activity relationship for the phototoxicity of furocoumarins has been clearly delineated from human studies (for example, L. Musajo et al, Herba Hungarica, 1971, Tom. 10, No. 2–3, pp. 79–94), and these studies show that photosensitizing activity is removed by ring hydroxylation or by lengthening the alkyl-chain length of ether substituents.

Careful evaluation of the literature shows that psoralen and certain low carbon number ether substituted furocoumarins that are given to humans in large doses do inhibit cytochrome P450. See, for example, D. Bickers et al., J. Investigative Dermatology, 79:201–205, 1982, M. Tinel et al., Biochemical Pharmacology, Vol. 36, No. 6, 951–955, 1987, H. Fouin-Fortunet et al., J. Pharm. Experimental Therapeutics, Vol. 236, No. 1, 237–247, 1986, and D. Mays et al, Clin. Pharmacol. Ther., 42:621–626, 1987. Thus, and because the known successful inhibitors of the first-pass effect generally inhibit cytochrome P450, a tempting conclusion, particularly in view of the recent disclaimers by Bailey, is that it is these low molecular weight furocoumarins present in citrus that are the active first-pass inhibitors in grapefruit juice. In fact, and as will be described more fully below with regard to the present invention, the present inventor has found that this is not the case, and that it is now possible to produce a citrus product that both inhibits the first pass effect and that contains no or reduced amounts of low molecular weight phototoxic furocoumarins.

OBJECTS OF THE PRESENT INVENTION

Figure 1:
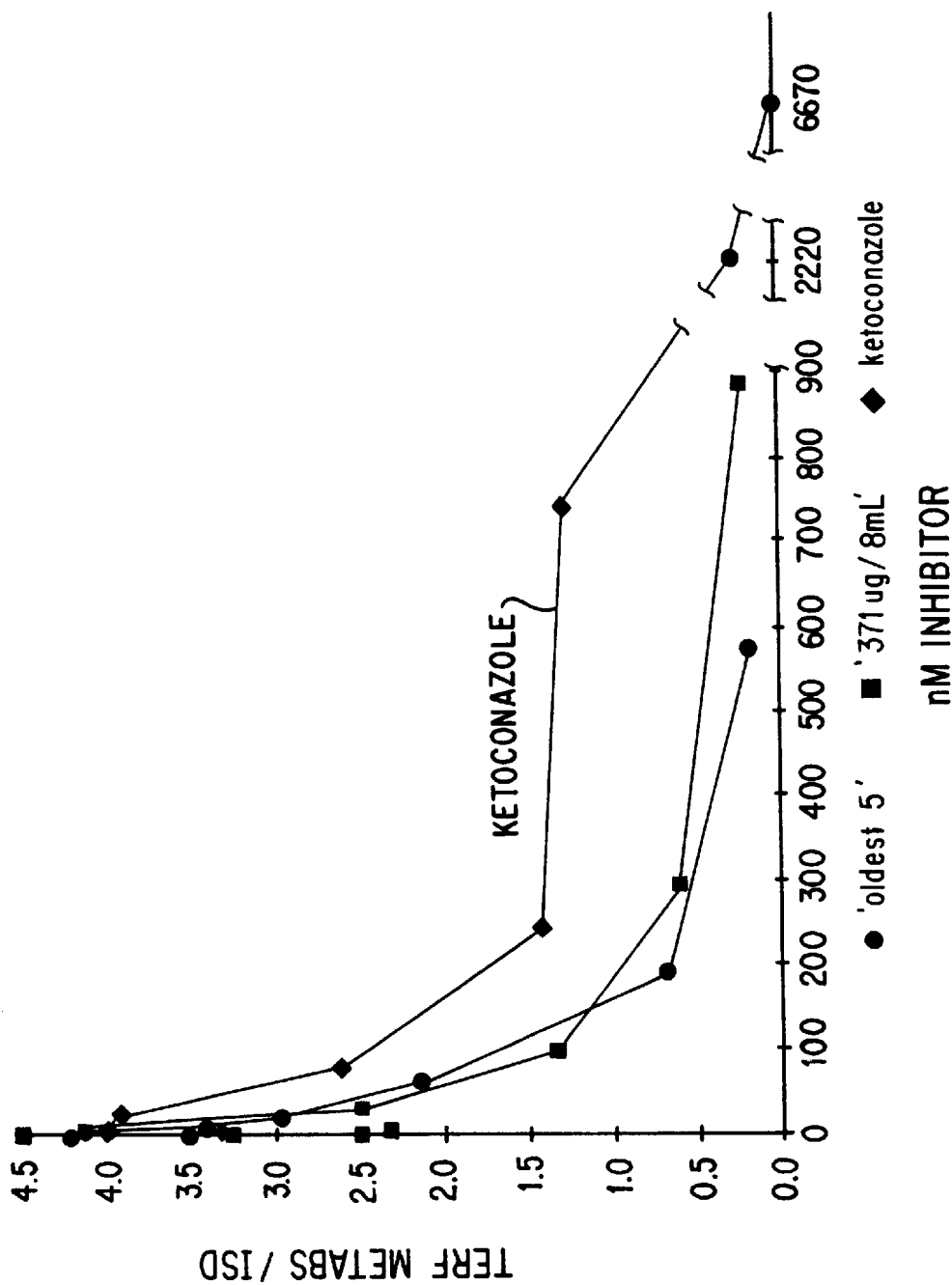
FIG. 1 shows the first-pass effect inhibiting ability of invention citrus-derived substances as compared to ketoconazole.

It is one object of this invention to provide a citrus-based (preferably lime- or grapefruit-based or derived) composition that inhibits the first-pass effect and that, optionally, is free of or contains a reduced amount (as compared to a naturally occurring amount) of phototoxic and, optionally, non-first-pass inhibiting low molecular weight furocoumarins.

Another object of the present invention is to provide a citrus-, preferably lime- or grapefruit-based composition that is effective against the first pass effect.

Another object of the present invention is to provide a citrus-, preferably lime- or grapefruit-based composition that contains no, or reduced amounts as compared to naturally occurring amounts, of phototoxic low molecular weight furocoumarins.

Another object of the present invention is to provide a citrus-, preferably lime- or grapefruit-based composition with consistent and reliable first-pass inhibiting activity.

Another object of the present invention is to provide the above-described compositions as a component of products that provide active ingredients, therapeutic agents, drugs, etc. or other substances that are subject to the first-pass effect to humans.

Another object of the present invention is to provide mixtures of one or more first-pass effect inhibiting compounds found in invention compositions with various therapeutic agents, active agents, drugs or other substances that are subject to the first-pass effect.

Another object of the present invention is the provision of a method for inhibiting the first-pass effect in patients taking drugs having a first-pass effect.

Another object of the present invention is a method for preparing the above-described compositions and mixtures.

Another object of the present invention is a method for preparing a citrus-based composition containing no or reduced amounts as compared to naturally occurring amounts of phototoxic and non-first-pass inhibiting furocoumarins preferably using reagents that the U.S. Food and Drug Administration regards may be used for food or drug manufacturing including GRAS materials. In this application, "non-first-pass inhibiting" includes first-pass activity provided by 2000 nM bergamottin and imperatorin according to Protocol C herein. See FIG. 2.

Another object of the invention is to provide and use first-pass effective compounds contained in the above compositions in isolated form and/or pyrogen-free form and/or sterile form and/or substantially pure form.

Another object of the invention is to provide a method of inhibiting the first pass effect by administration of the above compositions and active compounds to humans.

These and other objects will become apparent to those of ordinary skill in this art upon a full appreciation of the invention as described below with regard to preferred embodiments.

DETAILED DESCRIPTION OF THE PREFERRED EMBODIMENTS

The present inventor has discovered that phototoxic low molecular weight furocoumarins and certain ether-substituted furocoumarins that are naturally present in citrus extracts, juices, by products, etc. may be removed therefrom or reduced in concentration without destroying the first-pass effect inhibiting characteristics thereof. In addition, the present inventor has discovered a method for preparing such citrus-based compositions using only FDA acceptable reagents. Further, the present inventor has correctly identified those compounds present in citrus-based compositions that are responsible for the inhibition of the first-pass effect. The present invention has been completed on the basis of these findings and will be described in more detail below.

The citrus-based compositions of the present invention contain at least one first-pass effective citrus-derived extract, concentrate, peel, juice, oil, by-product, etc., (hereinafter referred to as the citrus-derived substance) and may be provided by any combination of these forms and may be derived from more than one citrus fruit. Useful citrus fruits herein include grapefruit, lemon, lime and any citrus fruit containing a first-pass effect inhibiting compound or mixture of compounds. Prior work in the field indicates that a common type of orange (*Citrus sinensis*) does not provide a first-pass effect. Citrus fruits that contain one or more substances that inhibit the first-pass effect are included in the invention, including all cross breeds, etc. and are referred to herein as "first-pass citrus". A preferred citrus fruit useful in the present invention is grapefruit. Another is lime. First-pass effective materials described herein are materials that prevent or retard the degradation of orally administered drugs in the body.

Preferred citrus-derived substances of the invention include cold-pressed citrus oil, particularly cold-pressed grapefruit, lime, lemon, etc., oil, and citrus by-products including tailings from citrus packing/juice plants. Cold-pressed citrus oils, including cold-pressed orange (except *Citrus sinensis*), grapefruit, lime and lemon oil, are commodities and are described, for example, in the Food Chemicals Codex, Fourth Edition, National Academy Press, Washington, D.C. 1996, incorporated herein by reference. Other citrus-derived substances useful herein include the various other citrus oils (distilled, essential, desert type, etc.), bitter cold-pressed oils, etc. Geographical origin of the invention citrus providing the citrus-derived substance is unimportant herein. Citrus juices or peel (rind) may also be used, as well as any first-pass effective solid, semi-solid or liquid portion of a first-pass citrus. Mixtures may be used.

The citrus-derived substance of the present invention compositions may make up the entire citrus-based composition or may be only a part thereof. Food grade or pharmaceutically acceptable diluents, excipients, carriers, etc., may be added, if desired.

The citrus-derived substance of the present invention composition is preferably treated so as to reduce the amount of phototoxic and, optionally, non-first-pass effective, furocoumarins naturally present therein. Preferably, these furocoumarins are completely removed, meaning that they are removed to an extent such that their presence is undetectable by liquid and, preferably, gas chromatography.

The invention method for removing phototoxic low molecular weight furocoumarins from invention citrus-derived components preferably comprises optional removal of volatile components (components removed after 12–24 h at a pressure of $10^{-2}$–$10^{-3}$ Torr) and extraction with mixtures of at least one $C_1$–$C_{10}$ alcohol (preferably ethanol) and water. The extraction mixture of alcohol and water is discarded and what is left is useful herein. $C_2$–$C_5$ alcohols are also preferred as are $C_2$ and $C_3$ and $C_4$ alcohols. The alcohol (ethanol) may either be 100% alcohol or may be conveniently supplied and used in commonly available alcohol-water dilutions (e.g., 95% ethanol/5% water, etc.). In all cases the alcohol (ethanol) reagent is preferably U.S.P. grade or better. The water used herein for extracting the invention citrus-derived substance (component) is preferably distilled water, and is also preferably U.S.P. grade or better. Any combination of solvents or single solvent may be used herein for extraction. The solvent(s) are preferably FDA acceptable for food and drug manufacturing.

The present invention method for removing phototoxic low molecular weight furocoumarins may include successive extractions with alcohol (ethanol)/water mixtures, and the successive alcohol (ethanol)/water mixtures used may either be of the same volume ratio or different volume ratios. Preferred alcohol (ethanol):water volume ratios range from 1:10–10:1, are more preferably 1:1 (±3%, 5%, 8% or 10%) and may be 45–60% alcohol (ethanol) on a volume/volume basis, and include 2:1, 3:1, 1:2, 1:3, etc. as well as 55/45, 60/40, 65/35, 70/30, 45/55, 40/60, 35/65, 30/70, etc. The extractions may be accomplished by any method known in the art including liquid-liquid extraction, liquid-solid extraction, etc. When the raw material used to prepare the invention citrus-derived extract is, for example, an oil, the alcohol (ethanol)/water mixture used for extraction can be simply added thereto, shaken therewith, and separated naturally or with the help of a centrifuge. Repeated extraction is helpful, as are continuous extraction methods such as countercurrent extraction, etc.

Preferably, the invention method for removing phototoxic low molecular weight furocoumarins significantly diminishes, and preferably completely removes beyond the detection limits of liquid and, preferably, gas chromatography, methoxy-substituted linear and angular furocoumarins including xanthotoxin (8-methoxypsoralen), bergapten (5-methoxypsoralen), isobergapten, isopimpinellin, etc., and unsubstituted linear and angular furocoumarins (psoralen, angelicin, etc.). Furocoumarins that have been determined herein to be ineffective first-pass effect furocoumarins may also be removed, if desired. These compounds include bergamottin, psoralen, angelicin, isopimpinellin and imperatorin.

The invention citrus-derived substance preferably contains at least one first-pass effective linear or angular furocoumarin of formula I, II or III:

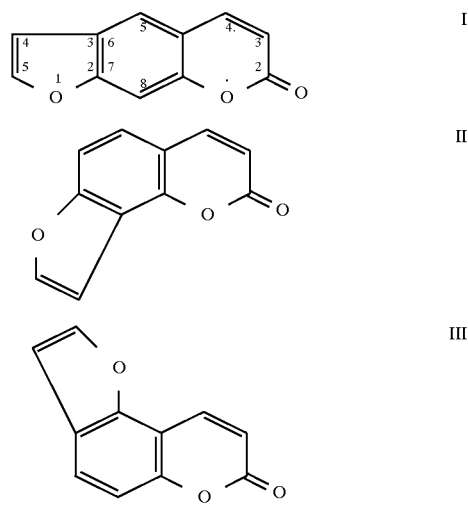

wherein one or more of the hydrogen atoms in the above three formulae may be replaced by one or any combination of two or more of hydroxy, halogen, linear or branched $C_1$–$C_{40}$ hydrocarbon, $C_1$–$C_{40}$ linear or branched ether (—OR where R is linear or branched hydrocarbon), $C_1$–$C_{40}$ alkylhydroxy (—ROH where R is linear or branched hydrocarbon and OH is bonded to a primary, secondary or tertiary carbon), etc. As used herein "hydrocarbon" means alkyl and alkenyl. Alkenyl is any hydrocarbon with at least one double bond. Compounds according to formulae I, II and III, optionally substituted as above, wherein one or more of the ring double bonds is hydrogenated are also included herein. The phototoxic furocourmarins discussed above are preferably excluded. See U.S. Pat. No. 5,356,929, incorporated herein by reference, for a general description of linear and angular furocoumarins and methods for their synthesis. The compounds described above may be synthesized by any general technique known in the art, and their synthesis is within the skill of the ordinary artisan in this field.

In addition to those compounds described above, specific furocoumarins included herein are those listed in Musajo, L., et al, *Chemica e Industria* (Milan) 35, 13–15 (1953), U.S. Pat. No. 5,356,929, Chapter 4 of Chemistry and Chemical Taxonomy of the Rutales, P. G. Waterman and M. F. Grundon, Eds., by A. I. Gray (Structural Diversity and Distribution of Coumarins and Chromones in the Rutales), Musajo, L., et al, *Herba Hungarica,* 1971, Tom. 10, No. 2–3, p. 79–94, Pathak, M. A. et al, *Nature*, Feb. 6, 1960, Vol. 185, p. 382, and Pathak, M. A., et al *Journal of Investigative Dermatology* (Vol. 32, p. 255, 1959, all of which are specifically incorporated herein by reference.

The present invention citrus-derived substance preferably contains a furocoumarin according to one of formulae I–III above having at least one relatively high carbon number ether substituent thereon. This relatively high carbon number ether substituent may be depicted chemically as —OR where R is a linear or branched, $C_2$–$C_{40}$ hydrocarbon group, preferably a $C_3$–$C_{40}$ linear or branched hydrocarbon group including those containing 3, 4, 5, 6, 7, 8, 9, 10, 11, 12, 13, 14, 15, 16, 17, 18, 19, 20, etc. carbon atoms. Excluded from this group of compounds is bergamottin, psoralen, angelicin, isopimpinellin and imperatorin which have been determined herein to be ineffective first-pass compounds.

The present invention citrus-derived substance is preferably administered in amounts of 2 micrograms—2 g per patient per day. Dosages are determinable by those of ordinary skill in the art and depend upon the extent to which a, e.g., active agent is subject to the first pass effect, etc. The invention citrus-derived substance may optionally be part of or added to a citrus-based composition or other edible material which is preferably a taste-masking flavor, juice, etc. The citrus-derived substance of the invention inhibits the first-pass effect of drugs taken orally by humans and other animals. A "first-pass effective amount" of the invention citrus-derived substance is any amount which reduces the first-pass effect of any substance by any amount (e.g., 1%, 5%, 10%, etc., up to 100% reduction in first-pass effect including all values and ranges between these values) as compared to the case where no invention citrus-derived substance is administered. A "first-pass effective" citrus-derived substance is a substance that inhibits the first-pass effect of at least one substance, preferably the first pass effect caused by the P450 system. This is also referred to herein as anti-first-pass activity. Administration is preferably co-administration, meaning just before, just after, or with active agent, therapeutic agent, medical food, drug subject to the first-pass effect, etc. "Just before" and "just after" include all times where the invention substance provides a benefit by inhibiting the first pass effect. Preferred forms of the invention comprise the invention citrus-derived substance inside of, e.g., a gel capsule, or co-formulated with food-grade or pharmaceutically-acceptable binders, diluents, etc. The citrus-derived substance is preferably provided in an amount that provides consistent, reliable potency from batch to batch regardless of the form in which it is provided.

The present invention citrus-derived substance may be co-formulated with drugs that are subject to the first-pass effect. Such co-formulations include the invention citrus-derived substance in amounts mentioned above with, typically, lesser amounts than currently necessary of drug active ingredients that are subject to the first-pass effect. One of ordinary skill in the art is capable of determining the dosage of both the invention citrus-derived substance and drug active ingredient based on simple testing procedures well known in the art and including pharmacological experiments which determine the amount of drug in the blood stream over a given time period after administration.

Drugs which are preferably co-formulated with the invention citrus-derived substance include ritonavir, saquinavir and indinavir. Other products useful for co-formulation herein are any and all drug, medical food, or other products that are subject to the first-pass effect. Examples of drugs are listed in the Merck Index, Twelfth Ed., Merck Research Laboratories, Whitehouse Station, N.J., 1996, incorporated herein by reference. Other preferable drugs useful for co-formulation herein include cyclosporin and tacrotimus. Determining whether a substance is subject to the first-pass effect is within the skill of the average artisan in this field.

Because adulteration of raw materials is known in the food, flavor, and fragrance industries, citrus-derived components of the invention including cold-pressed citrus oils should preferably be assessed before they are further used in the production of, e.g., compositions of dietary supplements. One strategy consists of sample preparation (Protocol A, this document), followed by chromatography (Protocol B, this document), and ending with comparisons to historical standards. Such assessment can provide consistent batches.

Protocol A: Preparation of citrus oils for administration to humans by removal of toxic, low molecular weight furocoumarins A volume of cold-pressed citrus oil (Food Chemicals Codex grade) was transferred to a container, and all volatile materials were removed. Although several methods exist for removing volatiles (e.g., distillation, distillation under reduced pressure, evaporation under ambient conditions), the preferred method uses Speed Vac concentrators (Savant Instruments; process requires 12–24 h and pressures of $10^{-2}$–$10^{-3}$ torr, and the system is run without added heat) because this method is gentle and expedient. The nonvolatile product yield is generally 0.04 to 0.1 times the initial volume and is a viscous liquid.

Low molecular weight, phototoxic furocoumarins were removed from the nonvolatile preparation by liquid—liquid extraction: 16 times the volume of viscous liquid of 1:1 ethanol:water (v/v; each U.S.P. grade) were added to the nonvolatile preparation, the container capped, the solution mixed vigorously, the container centrifuged (International Equipment Company, Model K-2, 5 min at setting 35), and the top ethanolic phase discarded. The extraction was repeated twice. Extraneous water and ethanol may be removed from the preparation if desired by use, e.g., of a Speed Vac apparatus. The product of this process may be used for human administration in, e.g., filled capsules.

Protocol B: Chromatography methods for processed citrus oils

The product of the above Protocol A is not suitable for any high pressure liquid chromatography because of the substantial presence of materials that are not soluble in the preferred mobile phase systems. Hence the sample preparation protocol that follows is used prior to chromatography. One volume of the product of Protocol A is mixed with four volumes of acetonitrile, the container is capped, the solution is mixed vigorously, the container is centrifuged (5 min at setting 35), and the top acetonitrile layer is filtered through a 0.22 micron teflon membrane. The filtered solution is stored in a closed container at −20 C. for 2 days or more and then is passed through filter paper while cold to remove a copious precipitate. The precipitation and filtration step is repeated once. The volume of the acetonitrile solution is noted, and the acetonitrile is removed using a Speed Vac apparatus. The residue is dissolved in half the original volume of acetonitrile, taking care not to disturb any crystalline precipitate, and the solution may now be used for HPLC assessment.

If preparative fractionation of the washed nonvolatile portion of citrus oil is desired, then the HPLC conditions given below are preferred. Linear gradients are used for elution and are formed by mixing mobile phase A composed of water with mobile phase B composed of acetonitrile (instrument: Hewlett Packard). The elution time, in minutes, as well as the percentage of acetonitrile present in the mixed mobile phase are as follows: 0, 75; 5, 75; 10, 90; 11, 98; 17, 98; 18, 75; 22, 75. The chromatographic column has dimensions of 250 mm length×4.6 mm internal diameter, is packed with C18 bonded to 4 micron silica particles (9% carbon load; YMC, Inc.), is protected with a 23 mm length×4 mm internal diameter column containing the same material and with a 0.5 micron filter, and is maintained at 40 +/− 0.2 C. The flow rate is maintained at 1.0 mL/min during the 22 min run cycle. The column eluate from each 25 uL injection is monitored at 400 +/− 200 nm and at 310 +/− 2 nm and is fractionated using a robotic collector (Gilson).

If qualitative or quantitative assessments of citrus oils, fractions thereof, or reference standards are desired, then the HPLC conditions given below are preferred. Linear gradients are used for elution and are formed by mixing mobile phase A composed of water with mobile phase B composed of acetonitrile (instrument: Hewlett Packard). The elution time, in minutes, as well as the percentage of acetonitrile present in the mixed mobile phase are as follows: 0, 10; 5, 10; 30, 80; 40, 80; 41, 95; 50, 95; 53, 10; 60, 10. The chromatographic column has dimensions of 150 mm length× 2.0 mm internal diameter, is packed with C18 bonded to 4 micron silica particles (14% carbon load; YMC, Inc.), is protected with a 2 mm internal diameter column packed with a proprietary material (Prism, Keystone Scientific, Inc.) and with a PTFE filter, and is maintained at 35 +/− 0.2 C. The flow rate is maintained at 0.20 mL/min during the 60 min run cycle. The column eluate from each 10 uL injection is monitored for absorbance at 400 +/− 200 nm and at 310 +/− 2 nm and for fluorescence with excitation at 229 nm, emission at 450 nm, and bandpass filtration at 370 nm.

Protocol C: Assessment of human cytochrome P450-mediated biotransformation

The process of preparing incubation mixtures begins by mixing 10 uL of ethanol or an ethanolic solution containing an inhibitor with 100 uL of 100 mg/mL bovine serum albumin (Sigma) dissolved in reaction buffer at room temperature. Reaction buffer is composed of 0.10M sodium phosphate, 1.0 mM ethylenediaminetetraacetic acid, and 5.0 mM magnesium chloride, pH 7.4 (all reagents: Fisher Scientific). Inhibitory chemicals used were ketoconazole (Research Diagnostics, Inc.), miconazole, bergapten, xanthotoxin (previous three from Sigma), bergamotin, imperatorin, isopimpinellin, psoralen, angelicin (previous five from Indofine Chemical Company, Inc.), and fractions or precipitates resulting from Protocols A and B above. When possible, final inhibitor concentrations were expressed in molarity by calculation from the weighed material or by interpolation from HPLC calibration curves prepared with reference materials; otherwise, concentrations are expressed as weight per volume. Reaction tubes are placed on ice in preparation for the manipulations that follow. Sufficient reaction buffer is added so that the final volume of each tube will be 500 uL, 5 uL of a 100-fold concentrate for generating reduced nicotinamide adenine dinucleotide phosphate is added (such that completed reaction mixture contains 1.0 mM nicotinamide adenine dinucleotide phosphate, 1 U/mL glucose-6-phosphate dehydrogenase, and 10 mM glucose-6-phosphate; all from Sigma), and then human hepatic S9 (Anatomic Gift Foundation) is thawed and added in sufficient amounts to cause readily detectable amounts of metabolites to be formed in control reactions (amount necessary varies among individuals, but 10 uL is typical). Reactions are pre-incubated for 3 min at 37 C. in a Dubnoff-type water bath, the reaction mixture is completed by the addition of 10 uL of 100 uM terfenadine (Sigma) dissolved in 1:1 acetonitrile-:water and by gentle mixing, the samples are incubated for 15 min at 37 C., and the reaction is stopped by placing the tube on ice and adding 2.5 mL of 300 nM terfenadine-related compound A (internal standard; U.S. Pharmacopeia) dissolved in acetonitrile.

The samples prepared above are readied for HPLC assessment using the protocol that follows. Each tube is vortex mixed and centrifuged for 10 min at setting 35, the resulting supernatant is transferred to a clean tube, and the liquid is evaporated using a Speed Vac apparatus. The residue in each tube is first dissolved in 40 uL 1:1 acetonitrile:water, 2.5 mL of acetonitrile is added, and the centrifuge-transfer-evaporate step just described is repeated.

The dry residue resulting from the above-described experiments and sample preparation protocol may be analyzed for terfenadine metabolites using the HPLC method described below and may also be used to quantitate the inhibitory chemicals that were added to the reaction (see Protocol B). Linear gradients are used for elution and are formed by mixing mobile phase A composed of water with mobile phase B composed of 0.025% (v/v) formic acid in acetonitrile (instrument: Hewlett Packard). The elution time, in minutes, the percentage of mobile phase B present in the mixed mobile phase, and the flow rate (mL/min) are as follows: 0, 10, 0.10; 2, 10, 0.10; 3.5, 10, 0.20; 4, 10, 0.25; 5, 10, 0.25; 30, 55, 0.25; 32, 98, 0.25; 33, 98, 0.40; 39.8, 98, 0.40; 40, 98, 0.25; 45, 10, 0.25; 45.25, 10, 0.20; 50, 10, 0.20; 50.25, 10, 0.10. The chromatographic column has dimensions of 150 mm length×2.1 mm internal diameter, is packed with a proprietary material (Prism, Keystone Scientific, Inc.), is protected with a 2 mm internal diameter column containing the same material and with a PTFE filter, and is maintained at 35 +/− 0.2 C. The dry sample residue is mixed with 60 uL of 1:1 acetonitrile:water followed by 40 uL water just prior to each 50.25 min run cycle. The column eluate from each 10 uL injection is monitored for fluorescence with excitation at 228 nm, emission at 291 nm, and bandpass filtration at 280 nm. Under these conditions, the retention times of terfenadine alcohol metabolite, terfenadine carboxylic acid metabolite, and the internal standard are 16.2 min, 17.4 min, and 22.2 min, respectively.

In order to demonstrate the first-pass effectiveness of the present invention, experiments with citrus-derived substances were conducted according to Protocol C above where generation of terfenadine metabolites were measured in the presence of various concentrations of inhibitor. Citrus-derived substances according to the present invention are compared to known inhibitor ketoconazole in FIG. 1 where "A" and "B" refer to invention citrus-derived substances from cold-pressed grapefruit oil both prepared according to Protocols A and B above.

Figure 2:
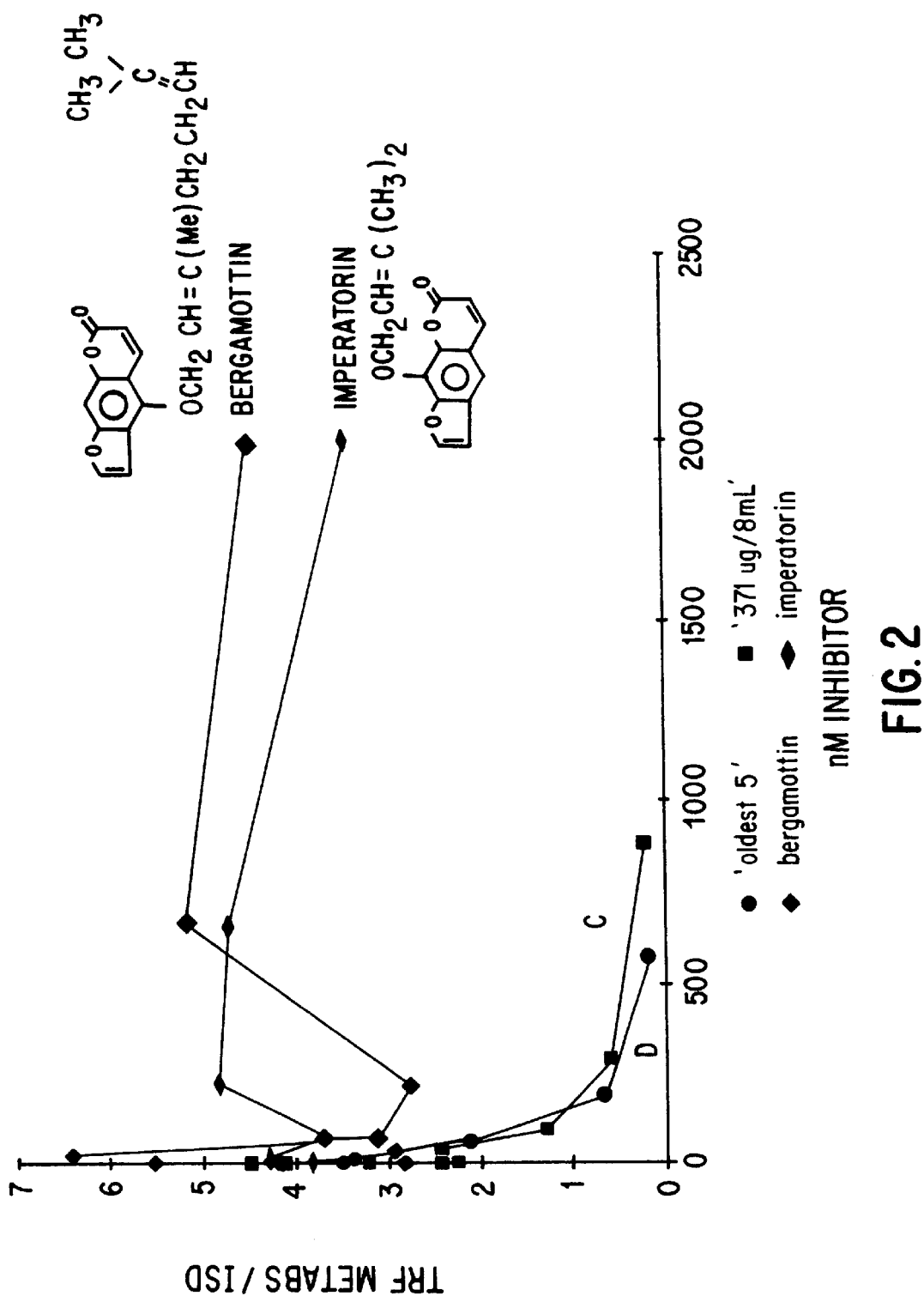
FIGS. 2, 3 and 4 show the first-pass inhibiting ability of various materials.
Figure 3:
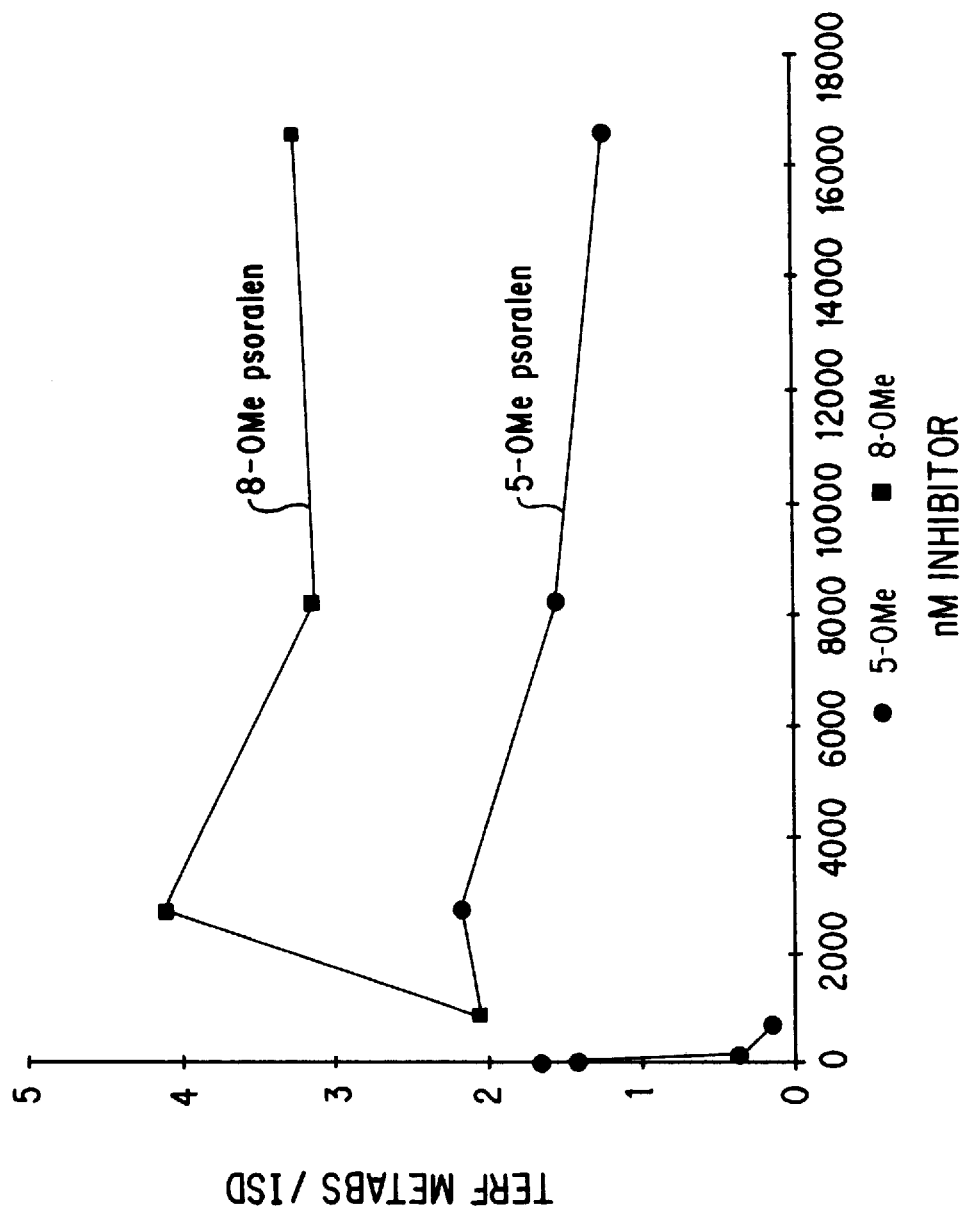
Figure 4:
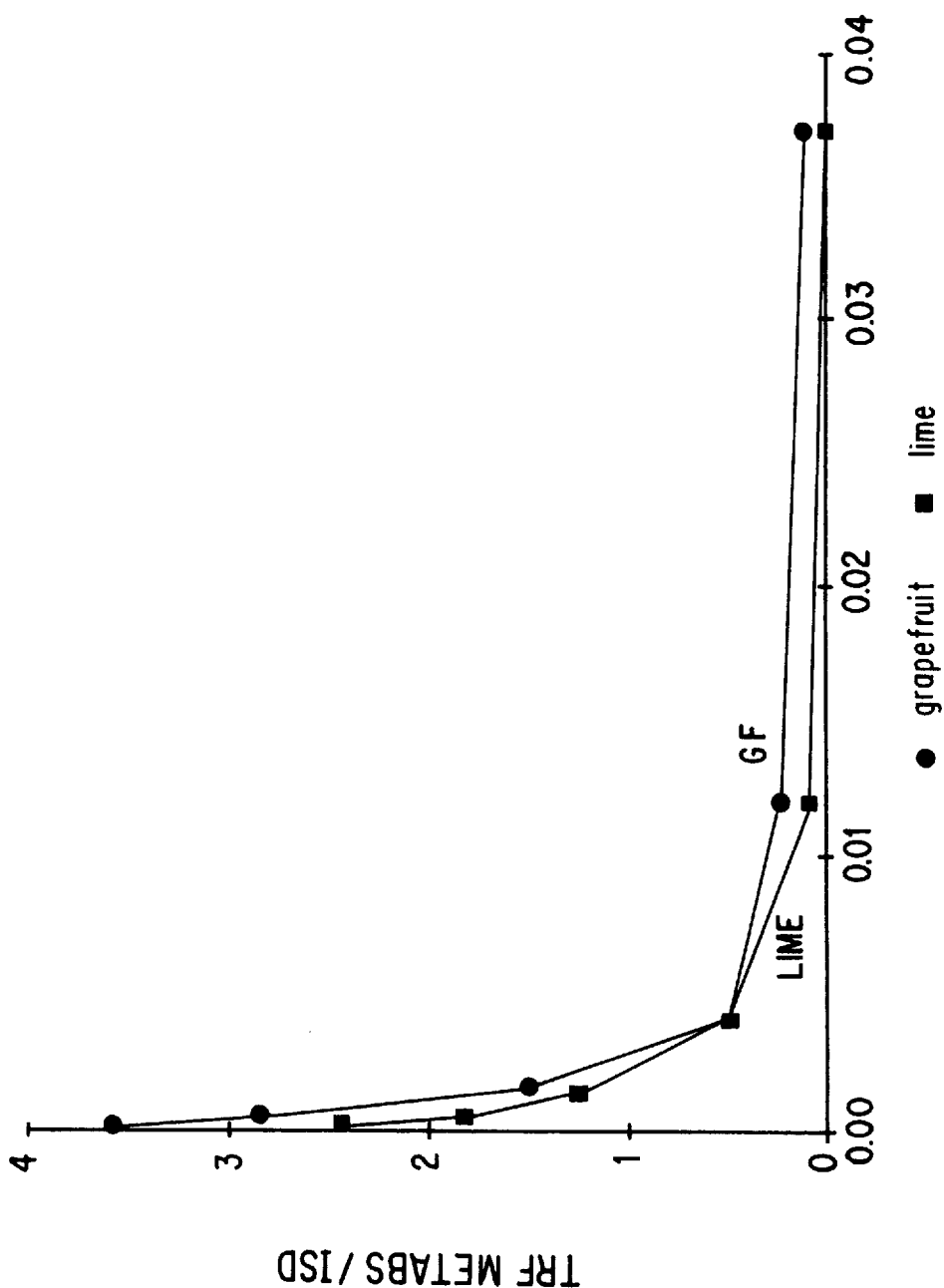

FIG. 2 shows that bergamottin and imperatorin are essentially ineffective first-pass inhibitors, while invention citrus-derived extracts C and D are effective inhibitors of the first-pass effect. FIG. 3 shows that the phototoxic constituents xanthotoxin and bergapten are far less effective than invention citrus-derived substance E at first-pass inhibition. Finally, FIG. 4 shows that lime extracts are as effective as grapefruit extracts.

What is claimed is:

1. A method for producing a first-pass effective citrus-derived substance, comprising:
   reducing the concentration of volatile materials contained in a citrus derived substance to produce a citrus derived product, and
   extracting said citrus derived product with a 60/40 to 40/60 vol/vol mixture of at least one $C_{2-4}$ alcohol and water to reduce the concentration of phototoxic furocoumarins therein and produce a first-pass effective citrus-derived substance.

2. The method of claim 1, wherein said citrus-derived substance is a cold-pressed citrus oil.

3. The method of claim 1, wherein said mixture of ethanol and water is a 1:1 volume/volume mixture of ethanol and water.

4. The method as claimed in claim 1, wherein said citrus derived substance is selected from the group consisting of citrus extract, citrus concentrate, citrus peel, citrus juice, citrus oil and mixtures thereof.

5. A first-pass effective citrus-derived substance which has been subjected to a reduction in the concentration of volatile materials initially contained therein and extracted with a mixture of a 60/40 to 40/60 vol/vol mixture of at least one $C_{2-4}$ alcohol and water so as to reduce the amount of phototoxic furocoumarins therein.

6. The citrus-derived substance of claim 5, wherein said substance is a cold-pressed citrus oil.

7. The citrus-derived substance of claim 5, which has been extracted with a 1:1 volume/volume mixture of ethanol and water.

8. A method for producing a first-pass effective citrus-derived substance, comprising:

reducing the concentration of volatile materials contained in a citrus derived substance to produce a citrus derived product, and extracting said citrus derived product with a mixture of at least one $C_2$–$C_4$ alcohol and water to reduce the concentration of phototoxic furocoumarins therein and produce a first-pass effective citus-derived substance, wherein said mixture contains 45–60% alcohol on a volume/volume basis.

9. The method as claimed in claim 8, wherein said citrus derived substance is selected from the group consisting of citrus extract, citrus concentrate, citrus peel, citrus juice, citrus oil and mixtures thereof.

10. The method as claimed in claim 8, wherein citrus-derived substance is a cold-pressed citrus oil.

11. The method of claim 8, wherein said mixture is a 1:1 volume/volume mixture of ethanol and water.

12. A first-pass effective citrus-derived substance which has been subjected to a reduction in the concentration of volatile materials initially contained therein and extracted with a mixture of at least one $C_2$–$C_4$ alcohol and water so as to reduce the amount of phototoxic firocoumarins therein, wherein said mixture comprises 45–60% alcohol on a volume/volume basis.

13. The citrus-derived substance of claim 12, wherein said substance is a cold-pressed citrus oil.

14. The citrus-derived substance of claim 12, which has been extracted with a 1:1 volume/volume mixture of ethanol and water.

* * * * *